Patented Feb. 9, 1926.

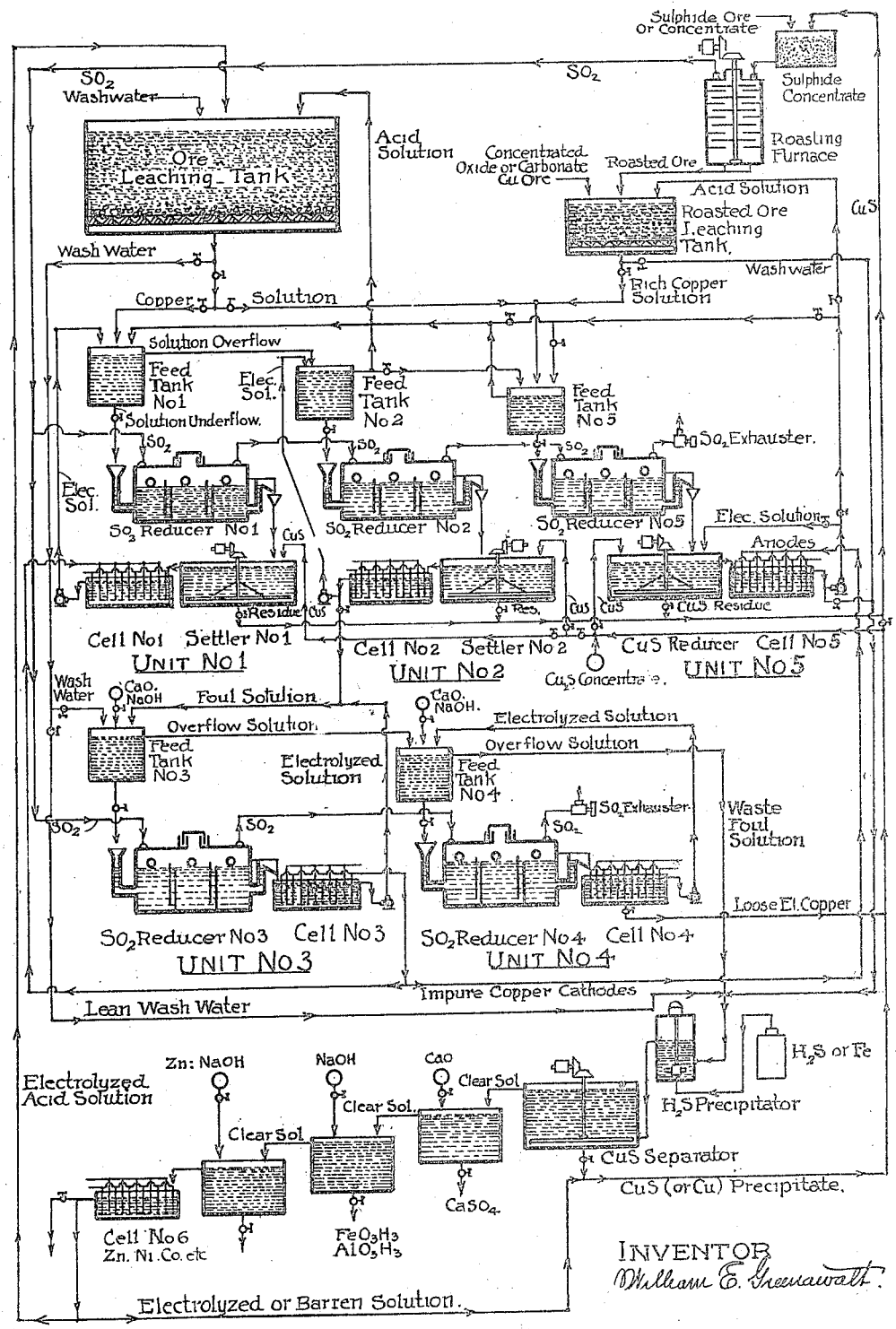

1,572,115

UNITED STATES PATENT OFFICE.

WILLIAM E. GREENAWALT, OF DENVER, COLORADO.

METALLURGICAL PROCESS.

Application filed December 1, 1924. Serial No. 753,134.

*To all whom it may concern:*

Be it known that I, WILLIAM E. GREENAWALT, a citizen of the United States, residing in the city and county of Denver and State of Colorado, have invented certain new and useful Improvements in Metallurgical Processes, of which the following is a specification.

The invention is more specifically directed to the extraction of copper from its ores by leaching and electrolysis, and may be considered as an improvement on processes patented by me as set forth in Patents No. 1,353,995, September 28, 1920, and No. 1,357,495, Nov. 2, 1920, and in my applications, Serial No. 664,085, filed Sept. 21, 1923 (Patent No. 1,528,209, Mar. 3, 1925), and Serial No. 689,613, filed Jan. 31, 1924 (Patent No. 1,542,935, June 23, 1925). The process is applicable to copper ores alone, or to copper ores containing other metals, although it is not intended to limit its use to any particular application.

In the treatment of copper ores by leaching and electrolysis, as set forth, for example, in Patent No. 1,353,995, it his been found that excellent results are obtained by passing the leach solution through a series of electrolytic units, each comprising a reducer and a group of cells, or electrolyzers, in a sort of compound circuit, which consists in circulating the solution or electrolyte in a practically closed circuit of each electrolytic unit, and progressively advancing a portion of the solution or electrolyte, which may be termed the "advance flow", through the series of electrolytic units, and then back to the leaching tank, where more copper is taken into solution and the complete cycle repeated.

In carrying out this general process it is quite necessary to effectively and automatically regulate the flow of solution through the respective electrolytic units, and as the solution or electrolyte becomes fouled with impurities a certain amount of the impure solution has to be discarded and an equal amount of water, preferably in the form of wash water, has to be added to maintain the solution at a certain standard of impurity of soluble salts.

The present invention pertains more particularly to the automatic regulation of the flow of solution through the respective electrolytic units, to the treatment of the discarded foul solutions and to the lean wash water to recover the copper from these solutions as the relatively pure electrolytic metal, and to other related details.

The process is best described by referring to the accompanying drawing, which represents a flow sheet of the invention in diagrammatic section.

The copper ore, crushed to suitable fineness, is treated in the leaching tank with a dilute acid solution to extract the copper, preferably in the form of sulphate. As all copper ores contain iron, the copper sulphate solution will be contaminated with iron sulphate, and this iron sulphate may become very injurious in the electrolytic deposition of the copper. When the copper sulphate solution, containing ferrous sulphate, is electrolyzed to deposit the copper, acid is regenerated and at the same time some of the ferrous sulphate is oxidized to the ferric sulphate, and this ferric sulphate, coming in contact with the deposited copper at the cathodes, re-dissolves the copper practically in proportion to the amount of ferric iron in the electrolyte. The amount of ferric iron in the electrolyte should not exceed 0.25% for good work; 0.5% has a decided detrimental effect; and when the amount of ferric iron reaches 1.0% the process becomes so greatly impaired as to make it impractical. While ferric iron in the electrolyte is highly detrimental, ferrous iron is practically harmless, and may be decidedly beneficial, since it is capable of acting energetically as a depolarizing agent in the deposition of the copper.

Sulphur dioxide is preferred as the general reducing agent for the ferric iron in the electrolyte, resulting from the deposition of the copper from a copper solution containing salts of iron. Sulphur dioxide is more effective as a reducing agent in neutral or slightly acid solutions than in solutions high in acid. In the deposition of copper from leach solutions, better efficiencies are obtained with rich than with weak solutions. The significance of these points may be illustrated as follows: Suppose the solution from the leaching tank contains 4.0% copper and it is desired to electrolytically precipitate the copper so that the depleted solution will contain 1.0% copper before it is returned to the leaching tank in the cyclic operation of the process: It is evident that the copper will have to be precipitated from a solution containing only about 1.0% copper, and about 8.25% acid, assuming that 2.75 lbs. of acid are regenerated per pound of copper precipitated. Under these conditions, the current efficiency would be low, the reduction of the ferric iron would be extremely difficult, and the deposited copper would be quite impure. To meet the conditions indicated, it is preferred to proceed as follows:

The neutral or slightly acid leach solution from the leaching tank, which for illustration purposes may be assumed to contain 4.0% copper and some soluble iron and other salts, flows into the feed tank No. 1, from which it flows in a substantially constant and regulated stream into $SO_2$ reducer No. 1, where it is treated with sulphur dioxide from the roasting furnace to reduce the harmful ferric iron to the harmless ferrous iron, with the simultaneous regeneration of an equivalent of acid. The reduced solution flows into the settler No. 1, where insoluble matter is settled out, and the clear overflowing solution flows into cell No. 1, where the copper is deposited and acid and ferric iron regenerated. Cell No. 1 is intended to be a conventional indication of one or more cells, depending on the size of the cells and the amount of copper to be deposited. The solution from cell No. 1, or electrolyzer, is then returned in a sort of closed circuit, to the reducer No. 1, through the feed tank No. 1, where the ferric iron formed by the electrolysis is again reduced. The solution issuing from the cell should not exceed 0.25% for really good work. The process is so regulated that a portion of the solution—the advance flow—overflows from feed tank No. 1 into feed tank No. 2, and into the $SO_2$ reducer No. 2, and this solution will contain about 2.5% copper and about 4.0% acid. From reducer No. 2 the solution flows into settler No. 2 and cell No. 2, where more copper is deposited and more acid and ferric iron regenerated. The solution, issuing from cell No. 2 is returned in a sort of closed circuit to the reducer No. 2 through the feed tank No. 2, while another portion—the advance flow—is returned to the ore, and this advance flow will contain about 1.0% copper and about 8.25% acid. Most of the copper produced will be produced in this way, and will represent the major output of the plant.

In time, the solution being circulated as indicated, will become charged with impurities, such as iron, aluminum, zinc, cobalt, nickel, and other salts, which necessitates the withdrawal of a certain amount of the foul solution, and the addition of a certain amount of water, preferably wash water, to keep the solution at a certain approximate standard for satisfactory operation.

A relatively small continuous stream of foul solution is diverted from the main leaching and electrolytic circuit, or circuit No. 1, to a secondary circuit, or circuit No. 2, where most of the remaining copper is deposited from the foul solution electrolytically, and the remaining small portion of the copper is then precipitated chemically, before the solution is wasted or treated to recover other metals.

The foul solution, under the assumed conditions for illustration purposes, will contain about 1.0% copper and about 8.25% acid, and iron and other salts. As already indicated, such a solution presents difficulties in electrolysis, due largely to the difficulty encountered in reducing the ferric iron formed by the deposition of the copper. It is preferred therefore to mix a certain amount of wash water from the leaching tank with the foul solution to reduce both the acidity and the percentage of impurities. Some of the excess acid may be neutralized by adding lime or caustic soda to the foul electrolyte. With the acid reduced, the ferric iron is much more easily reduced.

A small stream of foul solution, as determined by experience, is bled from circuit No. 2, into feed tank No. 3, of circuit No. 3, and from the feed tank the foul solution, preferably reduced in acidity, flows into reducer No. 3, where is is treated with a reducing agent, such as sulphur dioxide, after which it flows into cell No. 3, where a certain amount of copper is deposited with the simultaneous regeneration of acid and ferric salts. The solution is then returned, through the feed tank No. 3 to the $SO_2$ reducer No. 3, and the cycle continued, while a portion—the advance flow—goes to feed tank No. 4, to the $SO_2$ reducer No. 4, and the reduced solution flows into cell No. 4, and the cycle is repeated until most of the copper is deposited out of the foul solution. A neutralizing agent, such as lime or caustic soda may be added to the electrolyte as it flows into feed tanks No. 3 and No. 4. Under these conditions it has been found practical to deplete the foul solution of copper down to about 0.10%, and with a fairly high ampere efficiency. It has also been found that the copper can be deposited in fairly good hard form in cells No. 3, with the effluent solution as low as 0.25% copper, while the copper deposited in cell No. 4 is likely to be granular or spongy, and quite impure, but the ampere efficiency can be maintained fairly good, especially with a low current density, or a current density lower than that used in circuit No. 1, and in circuit No. 5, to be described later.

In depositing the copper from the foul solutions, it is preferred to use insoluble cathodes—such as lead sheets; that is to say cathode sheets which are insoluble when used as anodes. In cell No. 3 the copper deposited on the lead cathode sheet will be firm but somewhat impure. In cell No. 4, the copper deposited on the lead sheets will be granular or spongy and will not usually adhere to the lead cathode sheets, but the copper will drop from the lead sheet cathodes from time to time, and can be accumulated in the bottom of the tanks.

When the cathodes in cell No. 3 have accumulated sufficient copper to make their removal desirable, the cathodes are transferred to a rich copper electrolyte, as in cell No. 5, and used as anodes. In this way the impure copper from the foul solutions is re-dissolved and is re-deposited, at a comparatively small expense, as the pure electrolytic metal. There is an advantage in using insoluble cathode sheets for this purpose. When the impure cathodes obtained from the foul solutions are transferred to the rich copper solution and used as anodes, the copper will be transferred to pure cathode sheets, and when all the copper is re-dissolved, and re-deposited on the pure cathode sheets, the insoluble lead sheets, on which the impure copper was deposited, are again transferred to the foul solution in cell No. 3, and the cycle repeated. If the re-solution of the copper from the impure anodes, in cell No. 5 (transferred cathodes from cell No. 3) is uneven, it will not make a great deal of difference. When the copper is removed from the lead sheets, the lead sheets will act as insoluble anodes, but as the E. M. F. required to deposit copper from solutions with insoluble anodes is about 1.75 volts, under the assumed conditions, and about 0.3 volts for soluble anodes, the impure copper will be removed from the lead sheets before the lead sheets, or exposed portions of them, will act as insoluble anodes, so that no unusual refinement will be necessary in this operation.

The copper deposited in cell No. 4 is accumulated in the bottom of the tank and removed from time to time. This granular or spongy copper is preferably applied to the rich electrolyte in unit No. 5, where it is re-dissolved by using it as a reducing agent to reduce the ferric iron formed in the deposition of the copper in cell No. 5. If the electrolyte in unit No. 5 (circuit No. 5), becomes too acid, the loosely deposited copper from cell No. 4 may be roasted, and the resulting copper oxide used to regulate both the acidity and the copper content of the electrolyte in unit No. 5. The electrolyte in unit No. 5 is preferably a portion of the richer and purer copper solution from the ore leaching tank or from circuit No. 1, and both the acidity and the copper content of the electrolyte in unit No. 5 is preferably at least partly controlled by roasted concentrated copper material, such as copper sulphide concentrate, metallic copper, or copper sulphide obtained as a precipitate in the treatment of foul electrolyte or waste lean wash waters. The reduction of the ferric iron in unit No. 5 may be accomplished either with sulphur dioxide, copper sulphide, or metallic copper precipitate. Copper sulphide precipitate is very convenient and effective for this purpose and is preferred; the reducing action is positive, the ampere efficiency is high, and the deposited copper is very pure.

The effluent solution from electrolytic circuit No. 2 (units No. 3 and No. 4), containing about 0.10% copper, flows into the $H_2S$ precipitator, where the remaining copper is precipitated with hydrogen sulphide. The sulphide precipitate and the copper barren solution flow into a separating tank (CuS separator), where the CuS is separated from the solution. The CuS is transferred to unit No. 5, to be used direct in the reduction of the ferric iron produced by the electrolytic deposition of the copper, or, if it is desired to roast it and convert it into the form of oxide, it may be conducted to the roasting furnace, and roasted either alone or mixed with copper sulphide concentrate, and the roasted material used to reduce the acidity and to increase the copper content of the electrolyte. The copper barren solution then flows to waste, or if the solution contains other valuable metals, such as zinc, nickel, or cobalt, the excess acid is neutralized, and the impurities, such as iron and aluminum, are precipitated, preferably with lime. The neutralized and purified solution is then treated to recover the other metals, such as zinc, nickel, and cobalt, by any of the well known methods, such as by electrolysis, evaporation, crystallization, or by precipitation with a precipitant such as lime or sodium hydroxide. The precipitate is then separated from the barren solution and the solution wasted.

In leaching copper ore with an acid solution, considerable wash water is produced which is too lean to add to the electrolyte, and yet contains sufficient copper to make its recovery desirable. This lean wash water is conducted from the leaching tank to the $H_2S$ precipitator, where the copper is precipitated the same as that of the waste foul electrolyte.

It is desirable to maintain the electrolyte in unit No. 5 at a rough standard, at least in respect to acidity and copper content: This may be done, in part at least, by diverting a portion of the solution from unit No. 5 back to the leaching tank or unit No. 1, while a corresponding amount of richer and purer solution from the leaching tank or unit No. 1 is flowed into unit No. 5. This will always assure a suitable electrolyte in unit No. 5. This is best done by maintaining a small continuous stream of new solution from unit No. 1 to unit No. 5, and of old solution from unit No. 5 back to unit No. 1.

Unit No. 5 is used largely to refine the impure copper precipitated either electrolytically or chemically from the waste electrolyte or lean wash waters, while at the same time some of the copper is deposited from the electrolyte itself. All of the copper produced by this process is produced as the electrolytic metal.

The copper of the precipitate, used either as CuS or Cu goes into solution in unit No. 5 by acting on the ferric iron formed by the electrolysis in a solution containing salts of iron. If the precipitate is roasted the resulting copper oxide acts both on the acid and ferric iron.

It is preferred to precipitate copper from the lean wash waters and waste foul solutions after electrolysis, with hydrogen sulphide, although other precipitants, such as metallic iron, may be used. When hydrogen sulphide is used as the precipitant no more impurities are added to the solution while if iron is used as the precipitant an equivalent of iron goes into solution, and if other metals are to be recovered from the copper barren solution, it would be necessary to first eliminate this additional iron.

The number of reducers and electrolyzers composing the series of reducers and electrolyzers in the precipitation of the copper from the foul solutions (circuit No. 2) may be two or more: Usually two will give the best results, and will be so disposed that the copper which can be deposited in solid and adherent form, will be deposited in unit No. 1, while the copper deposited in loose form, will be deposited in unit No. 2.

The regulation of the flow of the liquid through the various units and from one unit to the next is important. It is evident that if the flow is increased by a small excessive amount of liquid, the cumulative effect of this small amount of excess will be to flood the system, and if the flow is reduced to a small amount below the normal, the rate of flow will be too slow for effective work. It is desirable to maintain a practically uniform condition for reduction and electrolysis even with a highly variable flow of liquid. This is preferably accomplished as follows:—The copper solution from the leaching tank is fed in a regulated stream into the feed tank No. 1, and, theoretically at least, the same amount of solution flows in a regulated stream from the feed tank into reducer No. 1, then into settler No. 1, and then into cell No. 1, and back to the feed tank. While this circulation is going on, the regulated stream of solution is all the time flowing from the leaching tank into the feed tank No. 1. This increment of solution—the advance flow—has to be passed to the next unit, or unit No. 2, where again the same constant stream of solution is circulated through the unit, while the increment of solution—the advance flow—has to be passed from unit No. 2, to the next step of the process. The flow of the solution through the various units is preferably controlled through the feed tanks, so that the irregularities in the flow are taken care of while still maintaining a substantially constant regulable or predetermined flow through the individual units. Feed tank No. 1 has a regulable inflow and a regulable underflow at the bottom to the reducer: It also has an unrestricted overflow to unit No. 2. No matter therefore how the solution flowing into the feed tank varies, the underflow into the reducer will be constant, as determined by the set of the valve in the underflow, and the underflow will remain constant until the set of the valve is changed. Similarly, feed tank No. 2 has a regulable predetermined underflow into reducer No. 2, even with a variable inflow into the feed tank. Feed tank No. 2 also has an unrestricted overflow, so that excess solution passes on and is finally returned to the leaching tank. In this way the solution can be automatically controlled for any number of electrolytic units. The by-passing of the excess solution by the arrangement of the feed tanks permits of wide variations in the rate of flow of the solution without detrimental results. The feed tanks may be considered as the equivalent of any arrangement any where in the circuit which will permit of a regulable or predetermined underflow from a pool of the solution to the reducer in the circuit with an unrestricted overflow to the next circuit: however, a feed tank of reasonable size will be the most satisfactory arrangement.

The increment volume of solution, presumably as delivered from the leaching tank, is passed through the series of electrolytic units, and may be designated as the "advance flow", and this increment of solution will usually vary, but the variations are not felt in the stream of solution flowing in closed circuit in the respective units. Manifestly also, the stream of solution being circulated in closed circuit in one electrolytic unit may be, and usually is, different in amount from that of another unit. For example; the stream flowing in closed circuit in unit No. 2 might be twice that flowing in closed circuit in unit No. 1. The stream of solution which flows from the feed tank will be returned to the feed tank, while the increment of solution passes on, no matter what the rate of flow is in the various units nor how variable the increment flow.

CuS, especially the CuS precipitate obtained from precipitating the copper from the lean and foul solutions with $H_2S$, is a more effective reducing agent for the ferric iron formed by the electrolysis in the deposition of the copper, than $SO_2$. When a very complete or thorough reduction is desired in units No. 1 and No. 2, it may be advisable to convey some of the CuS precipitate to the settlers No. 1 and No. 2, where the CuS will react with the ferric iron to reduce it. The clear overflowing solution goes to the electrolyzers. The residual sludge, from the CuS reduction, is drawn from the bottom of the settlers, and after removing the moisture, the residual sludge is roasted. In roasting, the sulphur is driven off and the copper converted into the oxide, while practically all of the impurities of the CuS residual sludge from the settling tanks is made insoluble, and are eliminated in the roasted ore leaching tank, while the copper goes into solution and helps to enrich the electrolyte in unit No. 5 in copper. The CuS residual sludge from the CuS reducer of unit No. 5, may be similarly treated.

It may be desirable to reduce the current density in the electrolytic deposition of the copper in units No. 3 and No. 4, especially No. 4, where the copper content of the electrolyte is small. If the acidity of the solution, say in unit No. 4, is kept very low, or the solution is maintained almost neutral, there will be no great difficulty in keeping down the ferric iron, and under these conditions a low current density can be used with a high ampere efficiency.

In the recovery of the metals, other than copper, from the diverted foul solutions, it is preferred to first precipitate the copper remaining after electrolysis, or say about .10%, with hydrogen sulphide. This will remove all of the copper, but a certain amount of acid will be generated in the deposition of the copper. It is preferred to neutralize excess acidity with lime. The resulting calcium sulphate can be settled out of the solution. The impurities of the iron group can be precipitated out with either lime or caustic soda. The resulting solution will contain zinc, nickel, cobalt, etc., and these metals can then be recovered from the purified solution either by electrolysis, precipitation, or crystallization. The barren solution may be returned to the ore, or if it is undesirable to return it to the ore, it may be wasted.

On account of the relatively high ferrous iron content of the electrolyte in units No. 3 and No. 4, and the low current density it is preferred to use in the deposition of the copper from this lean and foul solution, carbon anodes can be used to advantage, thus cheapening the cost of depositing the copper. Carbon anodes will stand up fairly well under good depolarizing conditions, such as those in units No. 3 and No. 4, and, as by the use of carbon anodes the voltage of deposition will be greatly reduced, the cost of deposition will be proportionately reduced.

The process has been described more particularly in reference to sulphate solutions: It is evident that it is applicable to chloride and other solutions.

The number of electrolytic units in circuit No. 1, each comprising a reducer and electrolyzer, may be two or more, depending on the nature of the copper solution, the size of the plant, and the results desired. Usually two or three electrolytic units in circuit No. 1 will be most satisfactory.

I claim:

1. A metallurgical process comprising leaching ores of copper with an acid solution, electrolyzing the resulting metal solution in a series of electrolytic units each comprising a feed tank a reducer and an electrolyzer, maintaining a substantially constant flow of electrolyte in a closed circuit in each of the respective units, and by-passing excess electrolyte through the feed tanks of the respective electrolytic units.

2. A process comprising leaching ores of metals with a solvent for the metals, electrolyzing the resulting solution in a series of electrolytic units each comprising a feed or solution regulating tank and an electrolyzer, maintaining a predetermined underflow of solution from the regulating tank to the electrolyzer of each unit of the series of electrolytic units, and maintaining an unrestricted overflow from the regulating tank of one of the electrolytic units to the regulating tank of another electrolytic unit.

3. A process comprising leaching ores of metals with a solvent for the metals, electrolyzing the resulting metal solution in a series of electrolytic units, maintaining a pool of solution in the circuit of each electrolytic unit and maintaining a predetermined flow of different amounts of solution and of different metal content in each circuit of the respective electrolytic units from the pool to the circuit of the respective electrolytic units composing the series and maintaining an unrestricted flow of solution from the pool of one electrolytic unit to the pool of another electrolytic unit.

4. A process comprising electrolyzing metal solutions in a series of electrolytic units each comprising an electrolyzer and an electrolyte regulating tank, maintaining a predetermined underflow of electrolyte from the regulating tank to the electrolyzer of each unit of the series of units the electrolyte of each unit having a different metal content, and maintaining an unrestricted overflow of electrolyte from the regulating tank of one unit to the regulating tank of another unit working in connection with the underflow of the respective regulating tanks.

5. A process of electrolyzing copper solutions obtained from leaching copper ores and containing salts of iron comprising, electrolyzing the solution to deposit the copper with the simultaneous regeneration of acid and ferric iron, reducing a portion of the ferric iron formed by the electrolysis with sulphur dioxide and then another portion with copper sulphide, and repeating the cycle of deposition and reduction with sulphur dioxide and copper sulphide until the solution is sufficiently depleted of copper and regenerated in acid, and then returning the regenerated acid solution to the ore.

6. A process of electrolyzing copper solutions containing salts of iron comprising, circulating the solution through a series of electrolytic units each comprising a reducer and an electrolyzer, reducing a portion of the ferric iron formed by the electrolysis in the respective units with sulphur dioxide and another portion with copper sulphide, and advancing the solution through the electrolytic units composing the series.

7. A process comprising leaching copper ore with an acid solution to extract the copper, alternately subjecting the resulting copper solution containing salts of iron to the action of a reducing agent and to the action of electrolysis to deposit the copper and regenerate acid and repeating the cycle of leaching, reduction, and electrolysis until the solution becomes fouled with impurities, then diverting a portion of the foul solution to a separate electrolytic circuit, reducing the acidity of the diverted foul solution, and then again alternately subjecting the diverted foul solution to the action of a reducing agent and to the action of electrolysis, the electrolysis of the diverted foul solution being made with a lower current density than the electrolysis of the regular leach solution.

8. A process comprising leaching copper ore with an acid solution to extract the copper, alternately subjecting the resulting copper solution containing salts of iron to the action of sulphur dioxide and to the action of electrolysis to deposit the copper and regenerate acid and repeating the cycle of leaching, reduction, and electrolysis, until the solution becomes fouled with impurities, then diverting a portion of the foul solution to a separate electrolytic circuit, reducing the acidity of the diverted foul solution, and then again subjecting the diverted foul solution to the action of sulphur dioxide, and to the action of electrolysis at a relatively lower current density, as compared with the electrolysis of the regular leach solution.

9. A process comprising leaching copper ore with an acid solution to extract the copper, alternately subjecting the resulting copper solution to the action of a reducing agent and to the action of electrolysis to deposit the copper and regenerate acid and repeating the cycle of leaching, reduction, and electrolysis until the solution becomes fouled with impurities, then diverting a portion of the foul solution to a separate electrolytic circuit, reducing the acidity of the solution, applying a reducing agent to the resulting solution, and electrolyzing the solution with a current density lower than that used in the regular leach solution circuit.

10. A process comprising leaching copper ore with an acid solution to extract the copper, alternately subjecting the resulting copper solution to the action of a reducing agent and to the action of electrolysis to deposit the copper and regenerate acid and repeating the cycle of leaching, reduction, and electrolysis until the solution becomes fouled with impurities, then diverting a portion of the foul solution to a separate electrolytic circuit, reducing the acidity of the solution, applying a reducing agent to the solution, and electrolyzing the reduced foul solution with carbon anodes.

11. A process comprising leaching copper ore with an acid solution to extract the copper, electrolyzing the resulting copper solution in a primary leaching and electrolytic circuit to deposit the copper and regenerate acid, returning the regenerated acid solution to the ore and repeating the cycle until the solution becomes fouled with impurities, precipitating copper from waste foul electrolyte or from lean wash water, applying the copper precipitate to a refining electrolytic circuit, and maintaining the electrolyte of the refining circuit at the desired standard by diverting a portion of the electrolye from the refining circuit to the primary leaching and electrolytic circuit and adding an equivalent of fresh leach solution to the refining circuit.

12. A process comprising leaching copper ore containing other metals with an acid solution to extract the copper and other metals, electrolyzing the resulting metal solution to deposit copper and regenerate acid, returning the regenerated acid solution to the ore and repeating the cycle until the solution becomes charged with other metals and fouled with impurities, then diverting a portion of the foul solution from the leaching and electrolytic circuit and precipitating the copper from said foul solution containing other metals, then precipitating undesirable impurities from the foul solution while retaining the desired metals in solution, then electrolyzing the purified solution to deposit the desired metal, and then returning the electrolyzed solution still containing a small metal content to the primary leaching and electrolytic circuit.

13. A process comprising leaching copper ore with an acid solution to extract the copper, electrolyzing the resulting rich copper solution to deposit the copper and regenerate acid, returning the regenerated acid solution to the ore and repeating the cycle until the solution becomes fouled with impurities, then diverting a portion of the foul solution from the electrolytic circuit and precipitating the copper therefrom, washing the ore and precipitating the copper from the wash-water, then using the precipitated copper from the lean and foul solutions in the form of anodes in the rich copper solution to convert the impure copper of the precipitate into the electrolytic metal.

WILLIAM E. GREENAWALT.